US010802468B2

(12) United States Patent
Sun et al.

(10) Patent No.: US 10,802,468 B2
(45) Date of Patent: Oct. 13, 2020

(54) METHOD FOR SIMULATING DAYLIGHT PERFORMANCE OF BUILDINGS BASED ON REGIONAL DAYLIGHT CLIMATE DATA

(71) Applicants: Cheng Sun, Harbin (CN); Yunsong Han, Harbin (CN); Ying Zi, Harbin (CN); Dagang Qu, Harbin (CN); Yongheng Jia, Harbin (CN); Lei Liu, Harbin (CN); Hong Yu, Harbin (CN)

(72) Inventors: Cheng Sun, Harbin (CN); Yunsong Han, Harbin (CN); Ying Zi, Harbin (CN); Dagang Qu, Harbin (CN); Yongheng Jia, Harbin (CN); Lei Liu, Harbin (CN); Hong Yu, Harbin (CN)

(73) Assignee: Harbin Institute of Technology, Harbin, HL (CN)

( * ) Notice: Subject to any disclaimer, the term of this patent is extended or adjusted under 35 U.S.C. 154(b) by 55 days.

(21) Appl. No.: 16/010,497

(22) Filed: Jun. 17, 2018

(65) Prior Publication Data
US 2019/0196448 A1 Jun. 27, 2019

(30) Foreign Application Priority Data
Dec. 26, 2017 (CN) .......................... 2017 1 1431184

(51) Int. Cl.
*G05B 19/4099* (2006.01)
*B33Y 50/02* (2015.01)
*B33Y 10/00* (2015.01)

(52) U.S. Cl.
CPC .......... *G05B 19/4099* (2013.01); *B33Y 50/02* (2014.12); *B33Y 10/00* (2014.12);
(Continued)

(58) Field of Classification Search
CPC ...... G05B 19/4099; G05B 2219/35134; G05B 2219/49007; B33Y 50/02; B33Y 10/00
See application file for complete search history.

(56) References Cited

U.S. PATENT DOCUMENTS

| 2015/0248504 | A1* | 9/2015 | Glunz | B33Y 50/00 700/98 |
| 2016/0001508 | A1* | 1/2016 | Dessel | H04N 1/00827 264/40.1 |

(Continued)

OTHER PUBLICATIONS

L Michel, "Performance of a new scanning sky simulator", 1995, Lighting Res. Technol. 27(4) 197-207 (1995) (Year: 1995).*
(Continued)

*Primary Examiner* — Thomas C Lee
*Assistant Examiner* — Michael Tang
(74) *Attorney, Agent, or Firm* — Lili Chen

(57) ABSTRACT

The present invention provides a method for simulating daylight performance of buildings based on regional daylight climate data. The method comprises the steps of: establishing a regional sky luminance distribution database from measured data; mapping sky luminance data to an artificial sky lamp group; using a 3D printing machine to fabricate a scaled physical model based on real parameters of the building to be simulated; and using the scaled physical model in the artificial sky integrated with regional sky luminance distribution data to make the daylight performance simulation. This method can achieve high-precision simulation of the daylight performance of buildings by using regional sky daylight climate data with a highly accurate physical model of the building.

5 Claims, 1 Drawing Sheet

(52) U.S. Cl.
CPC .............. *G05B 2219/35134* (2013.01); *G05B 2219/49007* (2013.01); *Y02A 90/16* (2018.01)

(56) References Cited

U.S. PATENT DOCUMENTS

| | | | |
|---|---|---|---|
| 2016/0236416 A1* | 8/2016 | Bheda | B29C 64/386 |
| 2016/0269630 A1* | 9/2016 | Chiou | G01J 1/4214 |
| 2017/0279612 A1* | 9/2017 | Liang | G04G 21/04 |

OTHER PUBLICATIONS

Mohamed Boubekri, "Use of 3D-Printing Technology in Architectural Research", 2015, Journal of Engineering and Architecture, vol. 3(2), Dec. 2015 (Year: 2015).*

Leland Curtis, "Parametric Daylighting Tools". 2015, downloaded on Oct. 7, 2019 from website https://www.radiance-online.org/community/workshops/2015-philadelphia/presentations/day2/RadianceWorkshop_ParametricDaylighting.pdf (Year: 2015).*

Antonio Rosato, "Use of a Scale Model Under Artificial Sky for Daylighting Design", 2013, Le Vie dei Mercanti XI Forum Internazionale di Studies, Jun. 13-14-15, 2013 (Year: 2013).*

Yunsong Han et al."Study on parametric daylighting simulation method for office building in severe cold region" Journal of Lighting Engineering, 2017, 28(4):39-46.

* cited by examiner

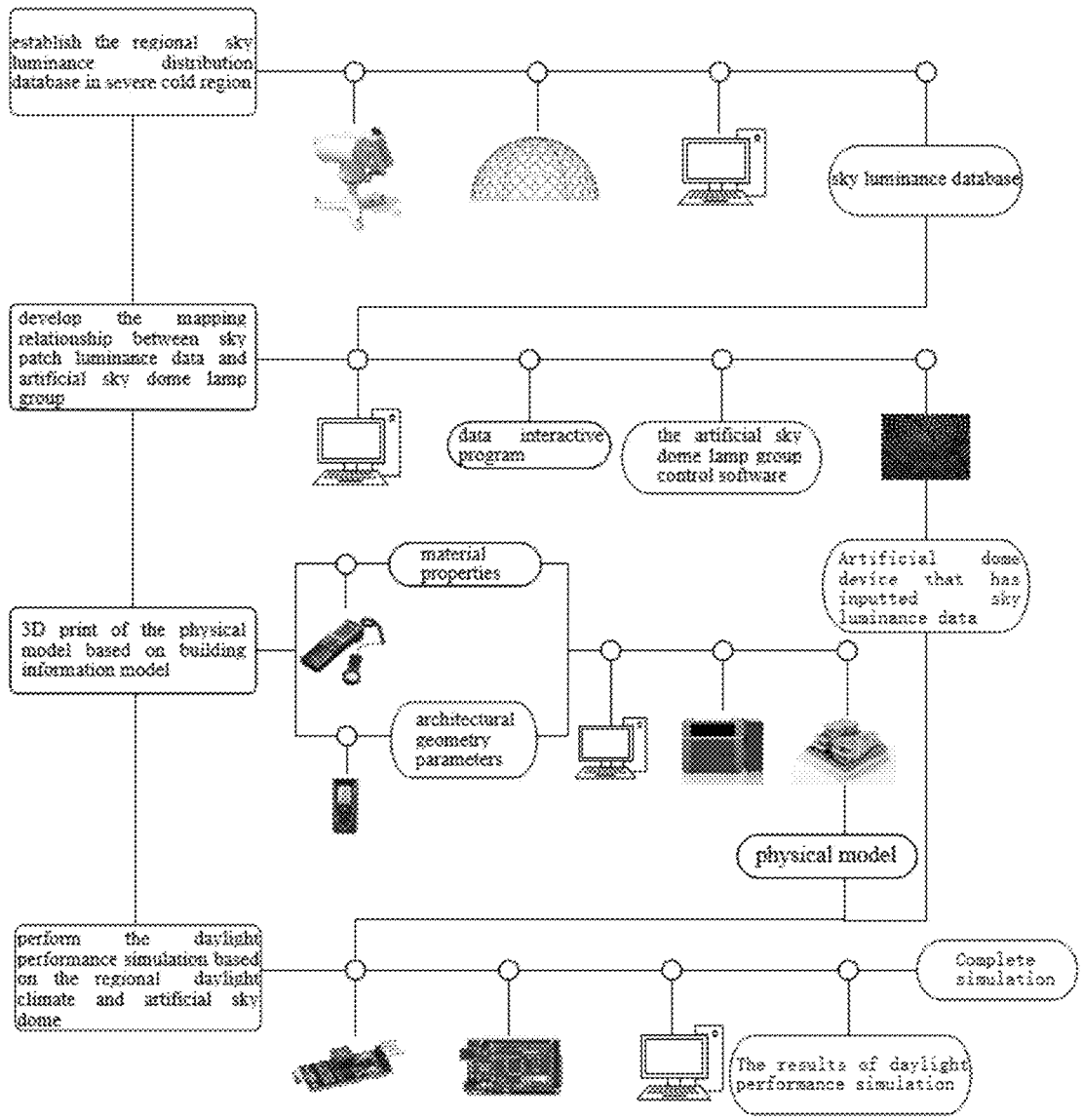

METHOD FOR SIMULATING DAYLIGHT PERFORMANCE OF BUILDINGS BASED ON REGIONAL DAYLIGHT CLIMATE DATA

CROSS-REFERENCES AND RELATED APPLICATIONS

This application claims priority of Chinese Application No. 201711431184.7, entitled "A Method for Simulating Daylight Performance of Buildings Based on Regional Daylight Climate", filed Dec. 26, 2017, which is herein incorporated by reference in its entirety.

BACKGROUND OF THE INVENTION

Field of the Invention

The invention relates to the technical field of building daylight performance simulation, in particular to a method for simulating the daylight performance of buildings in a particular region based on the regional daylight climate.

Description of the Related Art

Under the background of sustainable development, it is of great importance to make full use of the natural light of the building to reduce energy consumption, and the daylight can effectively improve the quality of the light environmental of the building. Daylight performance evaluation relies on theoretical calculations, software simulations and physical model simulation. In particular, the software simulation and physical model simulation are the most widely used.

The most widely used tool in software simulation is Radiance. But the CIE standard sky and Perez sky used in Radiance cannot reflect real sky luminance distribution at a specific time and changes of sky luminance distribution. They are not adequate to define the real regional daylight climate. In addition, the reflection of the natural light calculated by the reverse ray-tracing algorithm in Radiance is different from the reflection of the real light in the building. The physical model simulation method can obtain the true reflection of the daylight in the interior space of the building, avoiding errors in the software simulation in this respect and having higher simulation accuracy than the software simulation method.

However, the current physical model simulation methods still have limitations. The limitation is that the existing artificial sky can only simulate the CIE standard sky, but cannot accurately reflect the real spatial and temporal distribution of the sky luminance, making it difficult to achieve accurate daylight simulation. Based on the existing scaled model making technology, the physical simulation model still takes the form of a standard form, and there are technical difficulties for simulation of non-standard models. The standard model has limitations in the representation of optical properties, such as reflectivity and transmittance, which affects the accuracy of the physical model simulation.

SUMMARY OF THE INVENTION

The invention aims to solve the two existing problems of the physical model simulation. First, the existing scaled models have limitations in accurately representing the real geometric properties of buildings and the optical properties of building materials. Secondly, the difference in luminance distribution between an artificial sky and the real sky also affects the accuracy of the simulation method. The invention provides a daylight performance simulation method based on regional daylight climate data, which can accurately represent the building geometric properties and the optical properties of building materials for both standard and non-standard buildings, and achieve high-precision simulation of daylight performance using real regional daylight climate data.

The present invention provides a method for simulating daylight performance of a building based on regional daylight climate data, comprising the following steps:

1) collect sky luminance data of a particular region and develop a regional sky luminance distribution database;

2) map the regional sky luminance distribution data in the database of step 1) to an artificial sky lamp group;

3) use 3D printing technology to fabricate a scaled physical model of the building based on the building geometry and the physical properties of the building materials; and 4) use the scaled physical model of step 3) and the artificial sky of step 2) to make the daylight performance simulation of the building.

In one embodiment of the invention, during the data collection of the step 1), the data acquisition time domain and the acquisition duration are determined according to the purpose of daylight performance simulation, the geographic information and the environmental information. In one embodiment, the method is used to simulate daylight performance of buildings in a particular region. The regional sky hemisphere is meshed and divided into 145 sky patches. The sky scanner is used to measure and collect the regional sky luminance distribution data at each sky patch at a time interval of 5 minutes. Based on the data collected by the sky scanner, a parametric modeling tool is used to establish a regional sky luminance distribution database.

In one embodiment of the invention, the step 2) comprises the steps as follows. Based on the regional sky luminance distribution database in step 1), parametric programming techniques are used for secondary development of the control software of the artificial sky lamp group. A data interaction interface program between the artificial sky control software and the sky luminance distribution database can be established. The artificial sky control software can then interact with the sky luminance distribution database to map the sky luminance data to the corresponding artificial sky lamps.

In one embodiment of the invention, the step 3) comprises the steps as follows. A laser range finder and an illuminometer are used to actually measure the geometric parameters of the building to be simulated and optical properties of the building materials. A building information modeling tool is used to make a digital building model based on the measured parameters of the building to be simulated. Alternatively, geometric parameters of the building to be simulated and optical properties of building materials can be retrieved from the design drawing of the building and integrated into the digital building model. The digital model of the building is further scaled to the size of the artificial sky experimental area. The information in the digital building model can be transformed into a digital control construction document. The digital control construction document is then applied to photosensitive resin 3D printing to fabricate a scaled physical model of the building that can accurately reflect the geometric characteristics of the building and physical properties of the building materials.

In one embodiment of the invention, the step 4) comprises the steps as follows. The plane height and the density of the analysis grid of the scaled physical model are set according to the purpose and accuracy requirements of the daylight simulation. Illuminance sensors are placed at the center of each analysis grid, and the sensors are connected with and controlled by an Arduino board. According to the simulation time requirement, the artificial sky control software is used to read the sky luminance distribution data at the corresponding time points from the regional sky luminance distribution database, and adjust the luminance of each artificial sky lamp accordingly. The illuminance sensors record the luminance data from each analysis grid of the scaled physical model to obtain the daylight performance simulation data.

BRIEF DESCRIPTION OF THE DRAWINGS

FIG. 1 shows the workflow of the present invention for simulating daylight performance of a building in a particular region based on regional daylight climate data.

DETAILED DESCRIPTION OF THE INVENTION

The technical details of some embodiments of the present invention will be clearly and completely described below with reference to the accompanying drawings in the following embodiments. The embodiments are described for illustration purpose only, not to limit the scope of the present invention which is defined by the claims hereafter.

The present invention provides a method for simulating daylight performance of a building based on regional daylight climate data. The sky luminance distribution data of the region is measured using a sky scanner to develop a regional sky luminance distribution database. Through the secondary development of artificial sky control software and hardware, the artificial sky control unit is seamlessly integrated with the regional sky luminance distribution database. The 3D printer is used to fabricate a scaled physical model that accurately reflects the geometric properties of the building to be simulated and the optical properties (e.g. transmittance and reflectivity) of the building materials. The development board (e.g. an Arduino board) and illuminance sensors are used to collect and analyze the real-time illuminance data of the grid surface of the scaled physical models under different artificial skylight environments, achieving the accurate simulation of the daylight performance of buildings based on the regional daylight climate data.

As illustrated in FIG. 1, the present invention provides a method for simulating daylight performance of a building based on regional daylight climate data, comprising the following steps:

1) collect sky luminance data of a particular region and develop a regional sky luminance distribution database;

2) map the sky luminance distribution data in the database of step 1) to an artificial sky lamp group;

3) use 3D printing technology to fabricate a scaled physical model of the building based on the actual building geometry and the physical properties of the building materials; and 4) use the scaled physical model of step 3) and the artificial sky lamp group of step 2) to make the daylight performance simulation.

During the data collection of the step 1), the data acquisition time domain and the acquisition duration are determined according to the purpose of daylight performance simulation, the geographic information and the environmental information. In one embodiment, the method is used to simulate daylight performance in a particular region. The regional sky hemisphere is meshed and divided into 145 sky patches. The sky scanner (e.g. sky scanner MS-321LR) is used to measure and collect the regional sky luminance distribution data at a time interval of 5 minutes. Based on the data collected by the sky scanner, a parametric modeling tool is used to establish a regional sky luminance distribution database.

In one embodiment of the invention, the step 2) comprises the steps as follows. Based on the regional sky luminance distribution database in step 1), parametric programming techniques are used for secondary development of the artificial sky lamp control software. A data interaction interface program between the artificial sky lamp control software and the sky luminance distribution database is established. The artificial sky lamp control software can then interact with the sky luminance distribution database to map the sky luminance data to the corresponding artificial sky lamps.

In one embodiment of the invention, the step 3) comprises the steps as follows. A building information modeling tool is used to make a digital building model based on the real information of the building to be simulated. A laser range finder and an illuminometer are used to measure the geometric parameters of the building to be simulated and optical properties of the building materials. Alternatively, the parameters of the geometric properties of the building and optical properties of building materials can be retrieved from the design drawing of the building and integrated into the digital building model. The digital building model is further scaled to the size of the artificial sky experimental area. The information in the digital building model is transformed into a digital construction control document. The digital construction control document is then applied to photosensitive resin 3D printing to fabricate a scaled physical model of the building that can accurately reflect the geometric properties of the building and optical properties of the building materials.

In one embodiment of the invention, the step 4) comprises the steps as follows. The plane height and the density of the analysis grid of the scaled physical model are set according to the purpose and accuracy requirements of the daylight simulation. Illuminance sensors are placed at the center of each grid, and the sensors are connected with an Arduino board. According to the simulation time requirement, the artificial sky control software is used to read the sky luminance distribution data at the predefined time points from the regional sky luminance distribution database, and adjust the luminance of the artificial sky lamps according to the sky luminance data. The illuminance sensors record the luminance data of every analysis grid of the scaled physical model to obtain the daylight performance simulation data of the building.

The measurement data showed that the accuracy of the sky luminance model significantly affected the accuracy of daylight performance simulation. As shown in Table 1, compared to the existing methods of using standard CIE sky luminance data, the average error of the daylight performance simulation method of the present invention was reduced from 19.3% to 0.8%, the coefficient of correlation between simulation result and the measured data was increased from 86.6% to 97.4%, and the coefficient of determination was increased from 75.1% to 94.9%.

TABLE 1

Comparison between the simulation method of the invention and the existing simulation method

| | Average error | coefficient of correlation | coefficient of determination |
|---|---|---|---|
| Existing simulation methods using standard CIE sky luminance data | 19.3% | 86.6% | 75.1% |
| The simulation method of the invention using measured sky luminance data | 0.8% | 97.4% | 94.9% |
| Improvement of the accuracy | 18.5% | 10.8% | 19.8% |

The present invention significantly improved the accuracy of the daylight performance simulation method by integrating the real regional sky luminance distribution data in the simulation. Secondly, the building information modeling (BIM) and digital printing techniques are used to fabricate the scaled physical model of the simulated building, which significantly improves the simulation accuracy to reflect the geometric properties of the building and the optical properties of building materials. In terms of efficiency, 3D printing equipment is used to fabricate the scaled physical model. Compared to the traditional manual modeling method, the modeling efficiency of the physical model of the simulated building is significantly improved. Furthermore, by using the Arduino development board and the illuminance sensors for data collection, the traditional point-by-point data reading process is transformed into the whole grid data reading process, which significantly improves the simulation efficiency of the daylight performance of the building.

While the present invention has been described in some detail for purposes of clarity and understanding, one skilled in the art will appreciate that various changes in form and detail can be made without departing from the true scope of the invention. All figures, tables, appendices, patents, patent applications and publications, referred to above, are hereby incorporated by reference.

What is claimed is:

1. A method for simulating daylight performance of a building based on regional daylight climate data, comprising the following steps:
   1) collecting regional sky luminance data at predefined time intervals for at least a year using a sky scanner and developing a regional sky luminance distribution database with both spatial and temporal information;
   2) using parametric programming technology to map the sky luminance distribution data in the database of step 1) to an artificial sky lamp group and control the artificial sky lamp group based on the regional sky luminance distribution database to simulate spatial and temporal characteristics of the regional sky;
   3) using 3D printing technology to fabricate a scaled physical model of the building based on the building geometry and the physical properties of the building materials; and
   4) using the scaled physical model of step 3) and the artificial sky of step 2) to make the daylight performance simulation.

2. The method of claim 1, wherein the step 1) comprises the steps of:
   a) determining a sky luminance data acquisition time domain and an acquisition duration according to the purpose of daylight performance simulation, the geographic information and the environmental information;
   b) dividing a regional sky hemisphere into 145 sky patches;
   c) using the sky scanner to measure and collect the regional sky luminance data in each sky patch at a time interval of 5 minutes; and
   d) using a parametric modeling tool to establish the regional sky luminance distribution database based on the data collected by the sky scanner.

3. The method of claim 1, wherein the step 2) comprises the steps of:
   a) using the parametric programming technology to develop the control software of the artificial sky lamp group that has an interface with the regional sky luminance distribution database; and
   b) using the artificial sky lamp control software to map the data of the regional sky luminance distribution database to the corresponding lamps of the artificial sky.

4. The method of claim 1, wherein the step 3) comprises the steps of:
   a) using a Building Information Modeling software to make a digital building model based on parameters of the geometric properties of the building and the physical properties of building materials, wherein the parameters are obtained either from actual measurements or a design drawing of the building to be simulated;
   b) scaling the dimension of the digital building model to be proportional to that of the artificial sky areas to make a scaled digital building model;
   c) converting parameters of the scaled digital building model into a digital control construction document; and
   d) using the digital control construction document to direct a 3D printing machine to fabricate a scaled physical model of the building.

5. The method of claim 1, wherein the step 4) comprises the steps of:
   a) setting the plane height and the density of the analysis grid of the scaled physical model according to the purpose and accuracy requirements of the daylight simulation;
   b) placing illuminance sensors at the center of each analysis grid and connecting them with an Arduino board;
   c) using the artificial sky control software to read the sky luminance distribution data at the predefined time points from the regional sky luminance distribution database, and adjust the luminance of the artificial sky lamps according to the obtained sky luminance distribution data; and using the illuminance sensors to record the illuminance data of each analysis grid of the scaled physical model to obtain the daylight performance simulation data of the building.

* * * * *